L. N. SAVARIA.
MEASURING SPIGOT.
APPLICATION FILED FEB. 1, 1917.
1,273,279.
Patented July 23, 1918.
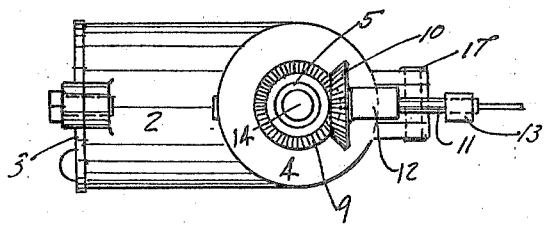
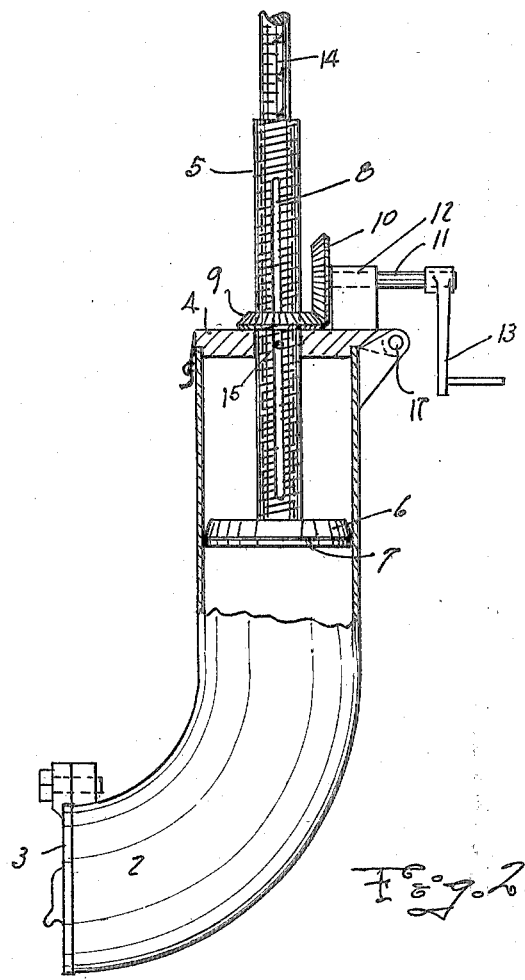
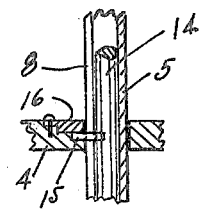
INVENTOR
Lster N. Savaria
BY
ATTORNEY

UNITED STATES PATENT OFFICE.

LESTER N. SAVARIA, OF BREMERTON, WASHINGTON.

MEASURING-SPIGOT.

1,273,279.　　　　Specification of Letters Patent.　　Patented July 23, 1918.

Application filed February 1, 1917.　Serial No. 145,841.

*To all whom it may concern:*

Be it known that I, LESTER N. SAVARIA, a citizen of the United States, residing at Bremerton, in the county of Kitsap and State of Washington, have invented certain new and useful Improvements in Measuring-Spigots, of which the following is a specification.

My invention relates to measuring spigots and has for its principal object to provide an improved and novel measuring device for dispensing semi-fluid products such as molasses, heavy oils, peanut butter and the like. Another object of my device is to provide an improved construction as regards the arrangement of the measuring scale and its coöperating parts.

In the drawings, Figure 1 is a plan view of my device. Fig. 2 is a side elevation of same with parts broken away. Fig. 3 is a fragmentary sectional detail showing the manner of fastening the scale.

Referring more particularly to the drawings, numeral 1 indicates a cylindrical casing which may have a curved lower portion 2. The lower end of the casing is provided with a swing gate 3 which is pivoted to said casing. The upper end of the casing is provided with a hinged cover 4 through which a tubular and threaded screw 5 passes centrally. The lower end of screw 5 is secured to a piston 6 which fits the inside of the casing 1 loosely and which is provided with a rubber gasket 7 which fits inside of casing 1 snugly. Screw 5 is longitudinally slotted as at 8 and is provided with a pinion 9 which is threaded internally to coöperate with the threads on the said screw. Pinion 9 meshes with another pinion 10 which is secured to a shaft 11. Shaft 11 is revolubly mounted in a bearing 12 which is integral with cover 4. Shaft 11 and the pinions 9 and 10 are revolved by means of a hand-operated crank 13 which is secured to the outer end of shaft 11. A cylindrical graduated scale 14 is mounted within screw 5 and is retained in a stationary position by means of a pin 15 which passes through slot 8 and is retained in a recess in the cover 4 by means of a clip 16. It will be understood that as the pinion 9 revolves it moves the screw 5 and piston 6 up or down as the case may be and that during this movement the scale 14 remains stationary. The scale 14 is graduated to read directly the quantity of the product which is discharged from casing 1 whenever the gate 3 is opened and the piston 6 is forced downwardly. When it is desired to refill the casing 1 the piston is run up to the uppermost end of its travel and the cover 4 is swung back about its hinge point 17. The casing 1 is then refilled and the cover 4 drawn back into position. While discharge indicating valves of one kind or another are common, applicant believes that the construction as regards the cover, tubular screw and scale are new and cheaper and more simple of construction than any of which he knows.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

1. In a device of the class described the combination of a covered casing, a tubular and threaded screw passing slidably through the said cover, a longitudinal slot extending throughout the greater part of length of said screw, a cylindrical stationary scale mounted within said screw, a pin passing through said slot and secured at one end to the said scale and at the other end to the said cover, whereby the said scale is retained against movement with respect to the cover.

2. In a device of the class described the combination of a covered casing, a tubular externally threaded and slotted screw slidably mounted within the said casing and cover, a cylindrical and stationary graduated scale mounted within the said screw, a pin passing through the said slot and secured at one end to the scale and at the other end engaging the said cover, and a clip secured to the cover and engaging the said pin against rotation, whereby the said screw may be moved independent of the said scale.

3. In a device of the class described, the combination of an externally threaded and longitudinally slotted tubular cylindrical screw, a stationary cover through which the said screw is slidably retained, a cylindrical stationary scale passing through the said screw, a scale retaining pin passing through said slot and secured to the said scale at one end and secured to the said cover at the other, whereby the scale is held against any independent movement with respect to the cover and screw and the screw is limited to a longitudinal sliding movement with respect to the scale and cover.

In testimony whereof I affix my signature in the presence of two witnesses.

LESTER N. SAVARIA.

Witnesses:
NELL MORRISON.
THERESE POORE.

Copies of this patent may be obtained for five cents each, by addressing the "Commissioner of Patents, Washington, D. C."